United States Patent
Palmer et al.

(10) Patent No.: US 6,423,167 B1
(45) Date of Patent: Jul. 23, 2002

(54) METHOD FOR CONTROLLING LAMINATE GLOSS

(75) Inventors: Dorothy Tepera Palmer, Temple; Jay T. Oliver, Belton, both of TX (US)

(73) Assignee: Premark RWP Holdings, Wilmington, DE (US)

( * ) Notice: Subject to any disclaimer, the term of this patent is extended or adjusted under 35 U.S.C. 154(b) by 0 days.

(21) Appl. No.: 09/441,075

(22) Filed: Nov. 16, 1999

Related U.S. Application Data

(63) Continuation-in-part of application No. 09/092,480, filed on Jun. 5, 1998, now abandoned.

(51) Int. Cl.$^7$ .................. B29C 43/20; B29C 59/04; B32B 31/22
(52) U.S. Cl. .................. 156/209; 156/219; 156/244.23; 156/244.27; 156/247; 156/323; 264/220; 264/257
(58) Field of Search .................. 156/209, 219, 156/247, 244.27, 230, 244.23, 220, 323; 264/220, 207

(56) References Cited

U.S. PATENT DOCUMENTS

| | | | |
|---|---|---|---|
| 3,733,381 A | 5/1973 | Willette et al. | 264/47 |
| 3,761,338 A | 9/1973 | Ungar et al. | |
| 3,869,535 A | * 3/1975 | Coll-Palagos | 264/219 |
| 3,997,696 A | 12/1976 | Jaisle et al. | 428/164 |
| 4,035,549 A | * 7/1977 | Kennar | 428/409 |
| 4,124,421 A | 11/1978 | Fujii | 156/87 |
| 4,284,453 A | 8/1981 | Endrizzi | 156/154 |

(List continued on next page.)

FOREIGN PATENT DOCUMENTS

| | | | |
|---|---|---|---|
| EP | 327095 | 8/1989 | |
| EP | 370 331 | 10/1989 | |
| EP | 348970 | 1/1990 | |
| EP | 370689 | 5/1990 | |
| EP | 909635 | 4/1999 | .......... B32B/27/30 |
| EP | 962315 | 12/1999 | |
| JP | 58220735 | 12/1983 | |
| JP | 2108599 | 4/1990 | .......... B44C/1/165 |
| JP | 4065237 | 3/1992 | .......... B32B/7/02 |
| JP | 4085347 | 3/1992 | |
| JP | 8141499 | 6/1996 | .......... B05D/7/14 |
| JP | 10035193 | 2/1998 | .......... B44C/1/165 |

OTHER PUBLICATIONS

EP Search Report, Feb. 28, 2001.

*Primary Examiner*—Sam Chuan Yao
(74) *Attorney, Agent, or Firm*—Welsh & Flaxman LLC

(57) ABSTRACT

A method for forming a glossy decorative laminate is disclosed. The method is achieved by stacking a decorative laminate sheet assembly having a top layer, casting a polypropylene release sheet wherein the polypropylene release sheet is processed with chill rollers treated in a manner which improves the gloss characteristics of the resulting decorative laminate, positioning the polypropylene release sheet on the top layer of the decorative laminate sheet assembly, applying heat and pressure to the decorative laminate sheet assembly and the polypropylene release sheet sufficient to bond the decorative laminate and releasably bond the polypropylene release sheet to the top layer of the decorative laminate sheet assembly, and removing the polypropylene release sheet from the top layer of the decorative laminate sheet assembly to reveal a decorative laminate exhibiting desirable gloss characteristics.

5 Claims, 1 Drawing Sheet

U.S. PATENT DOCUMENTS

| | | | |
|---|---|---|---|
| 4,297,945 A | 11/1981 | Sano et al. | 101/395 |
| 4,327,121 A | 4/1982 | Gray III | 427/44 |
| 4,657,006 A | 4/1987 | Rawlings et al. | 128/156 |
| 4,675,232 A | 6/1987 | Edenbaum et al. | 428/317.3 |
| 4,798,604 A | 1/1989 | Carter | 604/383 |
| 4,816,314 A | 3/1989 | Prawdzik et al. | 156/235 |
| 4,874,129 A | 10/1989 | DiSapio et al. | 239/36 |
| 4,880,589 A | 11/1989 | Shigemoto et al. | |
| 4,911,477 A | 3/1990 | Shishido | 283/100 |
| 4,913,760 A * | 4/1990 | Benson et al. | 156/244.11 |
| 4,925,728 A | 5/1990 | Crass et al. | 428/216 |
| 5,075,060 A * | 12/1991 | Imataki | 264/167 |
| 5,082,706 A | 1/1992 | Tangney | 428/40 |
| 5,281,455 A | 1/1994 | Braun et al. | 428/40.7 |
| 5,336,463 A | 8/1994 | Hara et al. | 264/328.7 |
| 5,613,964 A | 3/1997 | Grenier | 604/385.1 |
| 5,908,591 A | 6/1999 | Lewit et al. | 264/46.4 |
| 5,958,595 A | 9/1999 | Toomey | 428/423.5 |
| 6,093,256 A * | 7/2000 | Dwiggins et al. | 134/36 |

* cited by examiner

METHOD FOR CONTROLLING LAMINATE GLOSS

RELATED APPLICATION INFORMATION

This application is a continuation-in-part of U.S. patent application Ser. No. 09/092,480, filed Jun. 5, 1998, entitled "Texture Release Sheet, Method Of Making Texture Decorative Laminates Therewith, And Decorative Laminate Lay-Ups Including Such A Sheet", now abandoned.

BACKGROUND OF THE INVENTION

1. Field of the Invention

The invention relates to decorative laminates. More particularly, the invention relates to a method for producing glossy decorative laminates, as well as controlling laminate gloss, using a cast polypropylene release sheet.

2. Description of the Prior Art

High pressure decorative laminates are currently manufactured with smooth glossy surfaces, textured surfaces, or deeply sculpted and embossed surfaces. As general background, decorative laminates prepared by heat and pressure consolidation have been produced commercially for a number of years, and have found widespread acceptance in the building and furniture industry as counter and tabletops, bathroom and kitchen work surfaces, wall paneling, flooring products, partitions and doors. These decorative laminates may be described as containing a number of laminae consolidated to form a unitary structure carrying a surface decoration. The surface decoration may range from something as simple as a solid color to something as complex as an embossed simulated wood grain finish.

Decorative laminates generally include plural layers of synthetic resin impregnated paper sheets bonded under heat and pressure to form a unitary structure. In normal practice, a decorative laminate sheet assembly, from the bottom up, includes a core of one or more phenolic resin impregnated sheets, above which lies a decorative melamine impregnated sheet. The decorative sheet may be further covered with a melamine impregnated overlay. The core, or base, functions to impart rigidity to the laminate and usually includes a solid substrate which may, or may not, be formed prior to the initial laminating steps. Prior to stacking, the sheets of the core member are impregnated with a water alcohol solution of phenol formaldehyde, dried and partially cured in a hot oven, and finally cut into shapes.

The core may, for example, include a plurality of sheets of 90–150 pound phenolic resin impregnated kraft paper and a substrate. The kraft paper is impregnated throughout and bonded with a substantially completely cured phenolic resin which has been converted to a thermoset state during the initial laminating step. The substrate may be a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates.

The decorative sheet provides the laminate with an attractive appearance. The decorative sheet also dictates the surface characteristics of the decorative laminate. For example, the composition of the decorative sheet dictates the decorative laminate's resistance to chemical agents, heat, light, shock and abrasion. Decorative sheets are commonly manufactured from high quality 50–125 ream weight, pigment filled, alpha cellulose paper impregnated with a water alcohol solution of melamine formaldehyde resin. The resin impregnated decorative sheets are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate.

Decorative laminates are generally manufactured by placing the resin impregnated core and decorative sheet between steel plates and subjecting the laminate stack to temperatures in the range of about 800–1600 psi for a time sufficient to consolidate the laminate and cure the resins (generally about 25 minutes to an hour). The pressure and heat force the resin in the paper sheets to flow, cure and consolidate the sheets into a unitary laminated mass referred to in the art as a decorative high pressure laminate. Finally, the formed decorative laminate is bonded to a reinforcing substrate, such as, plywood, hardboard, asbestos board, particle board or the like.

Generally, more than one laminate is formed at one time. Multiple laminates are formed by inserting a plurality of assembled sheets in a stack. Release sheets are positioned between the assembled sheets to separate the various laminates stacked together. After consolidation, the release sheets allow the individual laminates to be separated.

In recent years, textured decorative laminates have become very popular. The textured surfaces range from relatively shallow depressions, such as, textured (e.g., satin, matte or semigloss) surfaces, to relatively deeply sculpted or embossed surfaces having a noticeable three-dimensional effect, such as, wood grain, leather, slate, abstract patterns, creative designs etc. In instances where glossy textured decorative laminates are manufactured, very expensive techniques are currently required to ensure the desired texture and gloss are imparted to the decorative laminate.

While the physical characteristics, ease of manufacture, and expenses have long made polypropylene a desirable material for use as a release sheet in the production of decorative laminates, polypropylene release sheets have historically generated decorative laminates exhibiting limited gloss. For example, cast polypropylene release sheets have historically produced relatively dull decorative laminates exhibiting laminate gloss of less than six. Similarly, blown polypropylene release sheets generally only generate a gloss of around 10 to 12.

As such, a need exists for a method and apparatus for producing decorative laminates exhibiting excellent gloss characteristics. The present invention provides such a method and apparatus.

SUMMARY OF THE INVENTION

It is, therefore, an object of the present invention to provide a method for forming a glossy decorative laminate. The method is achieved by stacking a decorative laminate sheet assembly having a top layer, casting a polypropylene release sheet wherein the polypropylene release sheet is processed with chill rollers treated in a manner which improves the gloss characteristics of the resulting decorative laminate, positioning the polypropylene release sheet on the top layer of the decorative laminate sheet assembly, applying heat and pressure to the decorative laminate sheet assembly and the polypropylene release sheet sufficient to bond the decorative laminate and releasably bond the polypropylene release sheet to the top layer of the decorative laminate sheet assembly, and removing the polypropylene release sheet from the top layer of the decorative laminate sheet assembly to reveal a decorative laminate exhibiting desirable gloss characteristics.

It is also an object of the present invention to provide a decorative laminate lay-up including a decorative laminate sheet assembly having a top layer and a polypropylene release sheet applied to the top layer of the decorative laminate sheet assembly. The polypropylene release sheet is a cast polypropylene release sheet processed with chill rollers treated in a manner which improves the gloss characteristics of the resulting decorative laminate.

It is still a further object of the present invention to provide a decorative laminate manufactured in accordance with the process described above.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
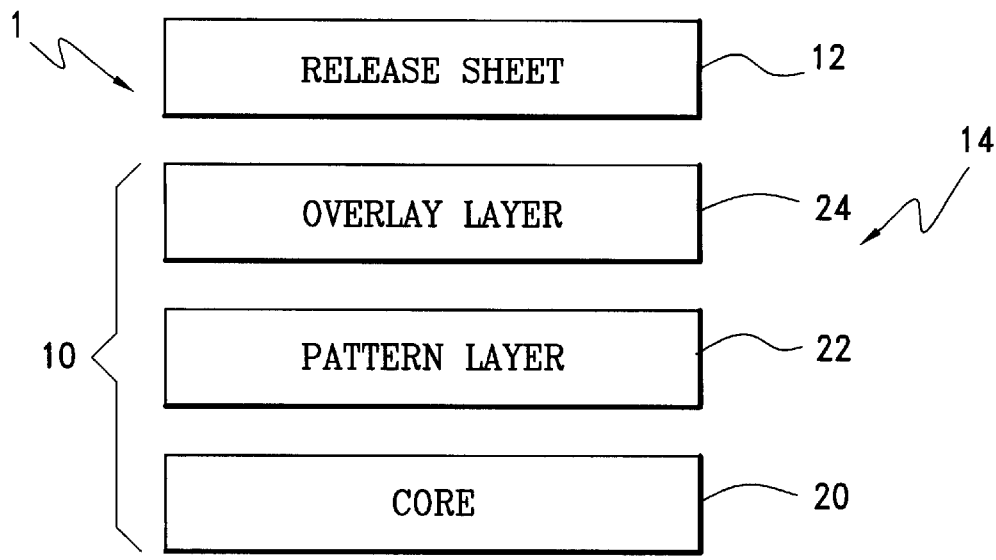
FIG. 1 is a schematic of the laminate lay-up including the polypropylene release sheet in accordance with the present invention.

With reference to FIG. 1, a decorative laminate lay-up 1 including a decorative laminate sheet assembly 10 and a polypropylene release sheet 12 is disclosed. The decorative laminate lay-up 1 is used in the manufacture of a glossy decorative laminate 18 in accordance with the present invention.

Figure 2:
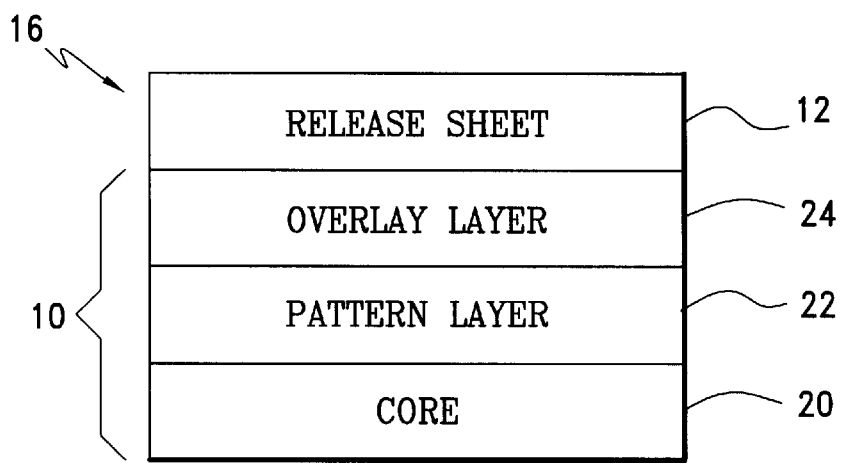
FIG. 2 is a schematic of the laminate lay-up after pressing and heating.
Figure 3:
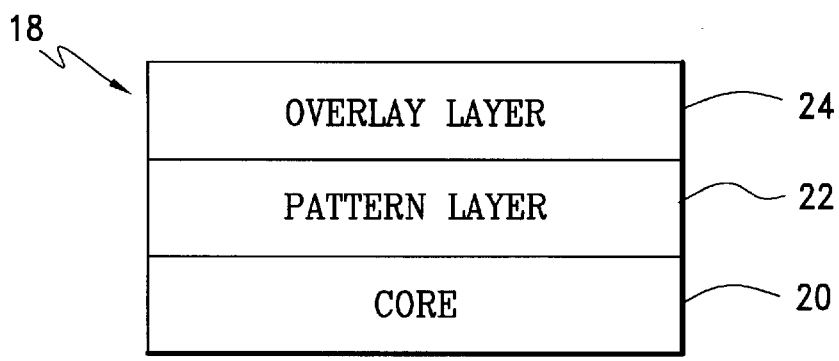
FIG. 3 is a schematic of the resulting decorative laminate.

The decorative laminate lay-up 1 is assembled by first stacking a decorative laminate sheet assembly 10 having a top layer 14. That is, the sheets used in the production of the decorative laminate are stacked in preparation for the heating and pressure steps used to consolidate the laminate. A polypropylene release sheet 12 is also cast. The polypropylene release sheet 12 is trated with chill rollers coated in a manner which improves the gloss characteristics of the resulting decorative laminate. The polypropylene release sheet 12 is then positioned on the top layer 14 of the laminate sheet assembly 10 to form the laminate lay-up 1, and heat and pressure are applied to the laminate sheet assembly/ polypropylene release sheet 16 sufficient to bond the layers of the decorative laminate sheet assembly 10, and releasably bond the polypropylene release sheet 12 to the top layer 14 of the decorative laminate sheet assembly 10 (see FIG. 2). Finally, the polypropylene release sheet 12 is removed from the top layer 14 of the formed decorative laminate 18 to reveal a decorative laminate exhibiting desired gloss characteristics (see (FIG. 3). In most instances the gloss is controlled to produce a glossy laminate in the range of approximately 10 to 30. However, since the desired gloss of laminates vary, the gloss may be controlled in any desirable manner and need not result in a laminate gloss of approximately 10 to 30 to remain within the spirit of the present invention.

The decorative laminate 18 may be any of the many resin based decorative laminates known to those of ordinary skill in the art. In accordance with one embodiment of the present invention, and as discussed above, the decorative laminate 18 includes a decorative sheet, or top layer, 14 and a core 20 as shown in FIG. 3.

More specifically, the decorative laminate 18 includes a core 20 composed of one or more layers of phenolic resin impregnated kraft paper 20a and a decorative sheet 14 composed of a pattern layer 22 and a melamine overlay layer 24 incorporating $Al_2O_3$ for wear resistance. As discussed above, a substrate may be subsequently bonded to the final decorative laminate 18 to add rigidity to the laminate; for example, the substrate may be chosen from a variety of materials, namely, plywood, particle board, chipboard, medium density fiberboard etc. Although a preferred decorative laminate is disclosed above, a wide variety of decorative laminates may be employed without departing from the spirit of the present invention.

As is well known to those of ordinary skill in the art, cast polypropylene release sheets are manufactured by extruding, rolling, cooling and cutting the polypropylene release sheets. In accordance with the present invention, the polypropylene release sheet 12 may be generally described as either a propylene homopolymer or a copolymer of propylene and any other $\alpha$-olefin.

The melt flow index of the polypropylene utilized in accordance with the present invention is selected to provide the desired physical properties necessary to produce textured decorative laminates exhibiting high gloss. Generally, the melt flow index will be in the range of approximately 1 to approximately 20 as measured utilizing ASTM D-1238. The melt flow index is preferably in the range of approximately 5 to approximately 15, and more preferably in the range of approximately 7 to approximately 12, as measured utilizing ASTM D-1238.

Non-limiting commercial examples of polypropylenes suitable for use in the present invention include EOD97-06 and EOD96-01, available from Fina (Dallas, Tex.) and ESCORENE polypropylene PD 4443, available from Exxon Chemical. EOD97-06 and EOD96-01 have a melt flow of 12 g/10 min. (ASTM D-1238 Condition "L"), density of 0.91 g/cc (ASTM D-1505), tensile strength of 5,800 psi (ASTM D-638), elongation of 10 percent at yield, tensile modulus of 280,000 psi (ASTM D-638), flexural modulus of 270,000 psi (ASTM D-790), melting point of 333° F. (DSC), and a recrystallization point of 261° F. ESCORENE polypropylene PD 4443 has a melt flow of 7.25 g/10 min. (ASTM 1238), density of 0.90 g/cm³ (ASTM D792), tensile strength of 3,300 psi in the machine direction, elongation at yield of 5% in both the machine and transverse directions, tensile strength at break of 8,000 psi in the machine direction and 7,000 psi in the transverse direction, elongation at break of 660 percent in both the machine and transverse directions, haze of 2/5%, gloss of 85% and a coefficient friction of 0.3.

As is well known to those of ordinary skill in the art, various processes and catalysts exist for the production of polypropylene. It is, therefore, contemplated that various processes and catalysts may be utilized without departing from the spirit the present invention.

For example, traditional Ziegler-Natta catalyst systems may be employed in accordance with the present invention. Ziegler-Natta catalyst systems utilize a transition metal compound cocatalyzed by an aluminum alkyl. Having been around since the early 1950's, the general manufacture methods for Ziegler-Natta type polyolefin catalysts, as well as general methods of making and subsequent use, are well known in the polymerization art.

More specifically, a Ziegler-Natta type polymerization catalyst is basically a complex derived from a halide of a transition metal, for example, titanium, chromium or vanadium, with a metal hydride and/or a metal alkyl that is typically an organoaluminum compound. The catalyst component is usually comprised of a titanium halide supported on a magnesium compound complexed with an alkylaluminum, and may even include an electron donor. Examples of such catalyst systems are shown in the following U.S. Pat. Nos. 4,107,413; 4,294,721; 4,439,540; 4,115,319; 4,220,554; 4,460,701; and 4,562,173; the disclosures of these patents are hereby incorporated by reference. These are just a few of the hundreds of issued patents relating to catalysts and catalyst systems designed primarily for the polymerization of propylene and ethylene.

"Metallocene" catalysts may also be used in accordance with the present invention. "Metallocene" catalysts include a metallocene and an aluminum alkyl component. The transition metal compound of a metallocene catalyst system has two or more cyclopentadienyl ring ligands. Accordingly, titanocenes, zirconocene and hafnocenes have all been utilized as the transition metal component in such "metallocene" containing catalyst systems for the production of polyolefins.

As discussed above, conventional cast polypropylene release sheets are extruded through a die and treated with chill rollers to cool the extruded sheet under controlled conditions. The present invention employs chill rollers treated in a predetermined manner to impart desirable hardness and smoothness characteristics to the extruded polypropylene release sheets. When these polypropylene release sheets are use in the manufacture of decorative laminates, the resulting decorative laminates exhibit a controlled gloss.

Specifically, it has been found that chill rollers chromed in a high temperature bath, for example, 120° F., produce polypropylene release sheets resulting in high gloss laminates. Where texture is first applied to the chill rollers (as will be discussed below in greater detail), the chrome application treatment includes engraving the polished roll with a microscopically smooth, shiny tool (no acid is used in the engraving process).

Alternately, it has been found that chill rollers treated with a co-deposition of TEFLON, a polytetrafluoroethylene, and electroless nickel produce polypropylene release sheets generating ideal results. Similarly, chill rollers treated with electropolishing also provide ideal results. In addition, chill rollers treated with an underlayer of nickel, and a co-deposition of TEFLON and electroless nickels improve the results provided by simple chill rollers treated with a co-deposition of TEFLON and electroless nickel.

In accordance with the preferred embodiment of the present invention, the co-deposition coating of TEFLON and electroless nickel, as well as the nickel underlayer with a co-deposition coating of TEFLON and electroless nickel, are preferably achieved using Series 200 "Infused Matrix" coating techniques of ENDURA COATINGS, Inc., Warren, Michigan. The Series 200 "Infused Matrix" Coatings are disclosed in the appended brochure, which is incorporated herein by reference. With regard to the electropolishing of the chill rollers, electropolishing is performed using the techniques described in "ELECTROPOLISHING a User's Guide To Applications, Quality Standards and Specifications", January 1998, Eighth Edition, Delstar Corporation, which is incorporated herein by reference.

Each of the chill rollers discussed above imparts a smooth microscopic surface to the cast polypropylene release sheet. It is believed that treating chill rollers to increase the hardness and smoothness characteristics of the resulting polypropylene release sheets optimizes the production of high gloss decorative laminates. In fact, it is believed that the hardness and smoothness characteristics of the cast polypropylene release sheet are critical to the gloss of the resulting decorative laminate. As such, and discussed above, the cast polypropylene release sheet should have a melt flow index in the range of approximately 1 to approximately 20 as measured utilizing ASTM D-1238. The melt flow index is preferably in the range of approximately 5 to approximately 15, and more preferably in the range of approximately 7 to approximately 12.

In addition, the resulting polypropylene release sheet should exhibit a smooth microscopic surface with no irregularities. As those of ordinary skill in the art will certainly appreciate, a variety of chill roller coating and/or treating techniques may be employed so long as the resulting polypropylene exhibits the desired characteristics discussed above.

The temperature of the chill roller may also be utilized to control the gloss of a resulting laminate manufactured in accordance with the present invention. For example, the an increase in the temperature of the chill roller within an acceptable range will provide and increase in the gloss of a resulting laminate manufactured in accordance with the present invention. In this way, slight changes in the gloss of a laminate may be readily controlled by simply increasing or decreasing the temperature of the chill roller. It is believed that the change in temperature affects the crystalline structure of the resulting polypropylene release sheet, and ultimately the gloss of the laminate manufactured using the polypropylene release sheet.

The polypropylene release sheets discussed above may also be used to simultaneously impart texture to the decorative laminate. Commonly owned U.S. patent application Ser. No. 09/092,480, entitled "Texture Release Sheet, Method Of Making Texture Decorative Laminates Therewith, And Decorative Laminate Lay-Ups Including Such A Sheet", filed Jun. 5, 1998, which is incorporate herein by reference, discloses a useful texturing technique which may be simultaneously employed with the present gloss method to create textured and glossy decorative laminates.

However, texture may be simultaneously applied with gloss by any suitable processing method capable of forming a textured release sheet for applying texture to a decorative laminate. In accordance with the preferred embodiment of the present invention, extrusion and casting are preferably employed to produce both high gloss and texture.

Briefly, the polypropylene is forced through an extrusion die in a melted state and subsequently cooled into a sheet as the melted extrudate passes between chill rollers. The chill rollers provide the desired texturing to the front surface of the sheet. The textured sheet is manufactured with a smooth back surface.

When this texturing technique is used in accordance with the present invention, the chill rollers are first textured to impart a desired texture to the treated polypropylene sheet. The textured chill rollers are then finished by applying chrome or by coating with a co-deposition of TEFLON, a polytetrafluoroethylene, and electroless nickel. Similarly, the chiller rollers may be coated with an underlayer of nickel, and co-deposition of TEFLON and electroless nickel. Alternately, the chill rollers may be treated with electropolishing alone, or the chill rollers may be electropolished before the application of the nickel/TEFLON co-deposition or the chrome.

Regardless of the method for forming the textured release sheet, it is critical that texture is imparted to the polypropylene release sheet generally while the polypropylene is still above the softening temperature, preferably while still above the melting temperature. The resulting textured release sheet will have a textured front surface and a smooth back surface.

The texturing of the present invention may take any form, dimension or pattern imaginable. In general, the peak-to-valley heigh $R_z$ of the texturing surface may be any desirable, but is preferably greater than $100\mu$ inches, more preferably greater than about $200\mu$ inches, and even more preferably greater than about $300\mu$ inches.

The thickness of the textured release sheet of the present invention may be varied within a wide range of limits. If the sheet is too thin, the texture will tend not to transfer. Economic factors tend to set the upper limit for the thickness of the sheet. In general, the thickness of the textured release sheet will be at least 1 mil, and preferably at least 1.5 mils, and more preferably at least 2 mils.

The textured polypropylene release sheet provides a textured surface to decorative laminates and also functions as a release sheet between conventional decorative laminate lay-ups. With this in mind, the present polypropylene sheets may be used in the gang processing of laminates or the present polypropylene sheets may be used in the manufacture of single laminate sheets to simply impart a desired texture and gloss. Whether the present polypropylene release sheet is employed to add texture to the decorative laminate, or not, the polypropylene sheet is applied to the decorative laminate in the following manner.

A typical decorative laminate sheet assembly includes several layers of a thermosetting resin impregnated core stock (preferably kraft paper) supporting a thermosetting resin impregnated decorative layer, which may be further overlaid with a thermosetting resin impregnated overlay sheet. The thermosetting resin employed is preferably a phenolic resin for the core stock, and preferably a clear melamine formaldehyde resin for the decorative and overlay sheets. The textured surface of the release sheet is oriented against the top most layer of the decorative laminate sheet assembly, be it the decorative sheet or overlay sheet, with the smooth back surface of the textured release sheet positioned against the core stock of an adjacent lay-up or steel plate.

Upon pressing between suitable laminate press plates, the textured release sheet imparts texture to the top most layer of the first lay-up, and serves to allow release between the first lay-up and the adjacent lay-up. A platen press assembly, as is well known in the lamination art, provides the necessary heat and/or pressure during lamination.

In practice, there may be utilized, as desired and/or necessary, antioxidants, antiblock agents, slip agents, cross linking agents, stabilizers, ultraviolet ray absorbers, lubricants, foaming agents, antistatic agents, organic and inorganic flame retardants, plasticizers, dyes, pigments, talc, calcium carbonate, carbon black, mica, glass fibers, carbon fibers, aramid resin, asbestos, as well as other fillers as are known in the art.

The polypropylene utilized in the present invention may be further blended with, or incorporated into, one or more other thermoplastics. Suitable other thermoplastics include polyolefins, especially polyethylenes, other polypropylenes, polyesters, polyacrylamindes, polyamides, polycarbonates, polyurethanes, polyacrylonitriles, and butadiene styrenes. Preferred polyethylenes include linear low density polyethylenes.

EXAMPLES

The following non-limiting examples are provided merely to illustrate the present invention and are not meant to limit the scope of the claims of the present invention.

Example 1

Thirty-nine films of various morphologies were post-embossed cold using a 6"×6" lab press. For texturing, 120 grit sandpaper and 80 grit sandpaper were used. Film samples listed in Table 1 were cut into 6" squares, paired with the sandpaper and pressed for one minutes at 1000 psi. The cold embossed films were then pressed, textured side to face, with resin impregnated decorative and kraft papers to make a high pressure laminate under high press decorative laminate (HPDL) conditions well known to those in the art. All films flattened under HPDL conditions and transferred no pattern.

TABLE 1

| NAME | DESCRIPTION | THICKNESS | SUPPLIER | TYPE |
|---|---|---|---|---|
| Toray | clear | 2 mil | Toray No Kingstown, RI | OPP |
| Toray | matte | 1 mil | | |
| Melinex 378 | matte | 92 ga | ICI Hopewell, VA | PET |
| Melinex HS2 | hazy | 92 ga | ICI | PET |
| Mylar ED11 | matte | 5 mil | Dupont | PET |
| Mylar XM020 | clear | 2 mil | Dupont | PET |
| Dartek C-917PA | clear | 2 mil | Dupont Canada | Nylon |
| Phanex YMC | matte | 2 mil | Hoechst Celenese | PET |
| Phanex IHC | clear | 2 mil | Hoechst Celenese | PET |
| Tedlar TMR10SM3 | matte | 1 mil | Dupont | PVF |
| Tedlar TMR20SM3 | matte | 2 mil | Dupont | PVF |
| XM020 | clear | 1 mil | Dupont | PEN |
| Embossed Laminated | clear | 2 mil | Cypress Pkg | PET/OPP |

TABLE 1-continued

| NAME | DESCRIPTION | THICKNESS | SUPPLIER | TYPE |
|---|---|---|---|---|
| Dartek T420NA | clear | 1 mil | Dupont Canada | Oriented Nylon |
| Dartek TC101NA | clear | 1 mil | Dupont Canada | Cast Nylon |
| Dartek C101NA | clear | 2 mil | Dupont Canada | Cast Nylon |
| Mylar 100XM020LS | hazy | 1 mil | Dupont | PET |
| Mylar 100XM020 | hazy | 1 mil | Dupont | PET |
| Kapton 100HN | gold/clear | 1 mil | Dupont | PI |
| Kapton 200HN | gold/clear | 2 mil | Dupont | PI |
| Kapton 100HA | gold/clear | 1 mil | Dupont | PI |
| Kapton 200HA | gold/clear | 2 mil | Dupont | PI |
| Kapton 200JP | gold/clear | 2 mil | Dupont | PI |
| Kapton 100JP | gold/clear | 1 mil | Dupont | PI |
| Tedlar TTR20SG4 | clear | 2 mil | Dupont | PVF |
| EX 399 | white | 2 mil | Exxon | CPP |
| EX 393 | white | 3 mil | Exxon | CPP |
| EX 355 | matte | 3 mil | Phillips Joanna | PP |
| 3700 TIS | | 3 mil | Moire of NC | UNK |
| Moire 763 | clear | 2 mil | Dupont | PET |
| Mylar 200J101 | clear | 2 mil | Dupont | PET |
| Mylar 200A | clear | 2 mil | Dupont | PET |
| Mylar 200D | clear | 2 mil | Dupont | PET |
| Mylar 640 GA 848 | clear | 6 mil | Dupont | PET |
| Mylar 200 J102 | clear | 2 mil | Dupont | PET |
| Mylar 200EL | clear | 2 mil | Dupont | PET |
| Mylar 200EB | clear | 2 mil | Dupont | PET |
| Melinex 378 | matte | 2 mil | ICI | PET |
| Melinex 378 | matte | 92 ga | ICI | PET |
| Melinex HS2 | clear | 92 ga | ICI | PET |

Example 2

A cycle was established for hot embossing PET and polypropylene (PP) against an aluminum wire mesh. The cycle for PET was 350F for 3.5 minutes. Polypropylene films were embossed at 290F for 3.5 minutes. Films listed in Table 2 embossed in this manner resulted in a film sample with a uniform texture on one side and a smooth surface on the other. All film samples transferred a uniform texture onto a laminate when pressed under HPDL conditions. Two film samples received in house already possessed a uniform texture on one side and a smooth surface on the other. These two were Moire Fingerprint film and Mylar 200WC from Dupont. Both samples transferred a uniform texture onto a laminate when pressed under HPDL conditions.

TABLE 2

| Melinex 377, 92 ga | ICI | PET |
|---|---|---|
| Mylar ED31, 1 mil | Dupont | PET |
| Tedlar TMR102M3 | Dupont | PVF |
| 100 XM020LS, 1 mil | Dupont | PEN |
| Kapton 100HN, 1 mil | Dupont | PI |
| Cast PP, 4 mil | PhilJo | PP |
| Cast PVC, 7 mil | Texas T&R | PVC |

Example 3

Polymer resins were obtained from outside sources and cast extruded using a 25 mm co-rotating twin screw extruder under the following extrusion conditions:

| Barrel Temp. | 170 C. |
|---|---|
| Die Zone Temp. | 180 C. |
| Melt Temp. | 175 C. |
| Feeder Rate | 20 lbf/hr |
| Sheet Caliper | 10 mils |
| Extruder Speed | 100 rpm |

The extruded film was cast embossed using a textured chill roll in the center of a 3-stack roll assembly. The embossed chill roll was engraved with a sand texture of 350 Ra. Polymers listed in Table 3 were extruded in this manner.

TABLE 3

| SOURCE | NAME | RESIN | % TRANSFER | LAMINATE GLOSS |
|---|---|---|---|---|
| Chemiplas | N/A | PET | 82 | 3.0 |
| Exxon | Escorene PD 4443 | PP | 75 | 7.0 |
| Eastman Chemical Co. | PET 10388 | PET | 85 | 3.0 |
| ICI Americas | Melinar PET | PET | 85 | 2.8 |
| Rexene Products | PP 13T10A | PP | 75 | 3.2 |
| Rexene Products | PP 13S10A | PP | 70 | 3.0 |
| Fina | EOD 97-06 | PP | 75 | 10.0 |

In all cases, film was made that resulted in a uniform texture on one side and a smooth surface on the other. All samples transferred uniform texture onto a laminate under HPDL conditions.

Profilometer readings of the film and laminate were measured to a evaluate the amount of texture transfer. The results are listed in Table 3.

Example 4

Fina EOD 97-06 and Exxon Escorine PD4443 were extruded under the same conditions as Example 3. The chill roll temperature was varied in order to determine if chill roll temperature effects gloss. The film was used to prepare high pressure laminates by standard means. The results are listed in Table 4.

TABLE 4

|  | Chill roll temp | Laminate gloss |
|---|---|---|
| Fina EOD 9706 | 75 C. | 12.6 |
|  | 95 C. | 23.2 |
|  | 115 C. | 28.9 |
| Exxon PD 4443 | 75 C. | 9.8 |
|  | 95 C. | 13.6 |
|  | 115 C. | 20.0 |

Example 5

Fina EOD 97-06 was extruded in a 30 to 1 length to diameter ratio single screw, 4.5" wide into a flat die with a chill roll casting section, at varying conditions in order to determine conditions that effect and texture transfer. The first chill roll was textured with sand texture of 450 Ra paired with a rubber roll. After extrusion, the films were aged for 48 hours at ambient temperature then used to make high pressure laminates under standard HPDL conditions. The surface textures of the films and laminates were measured with a Federal Surfanalyzer 5000 in order to determine percent texture transfer. The conditions and results are listed in Table 5.

TABLE 5

| Sample # | Chill Roll (F) | Line Speed (FPM) | Extruder Speed | Film Gauge | Nip Pressure | % Texture Transfer | Laminate Gloss |
|---|---|---|---|---|---|---|---|
| 1 | 150 | 48 | 76 | 3.8 | 18 | 50 | 6.6 |
| 2 | 150 | 48 | 76 | 3.5 | 55 | 46 | 5.9 |
| 3 | 150 | 48 | 76 | 3.8 | 35 | 70 | 6.4 |
| 4 | 150 | 84 | 135 | 3.5 | 38 | 65 | 7.3 |
| 5 | 150 | 74 | 135 | 3.5 | 38 | 85 | 7.5 |
| 6 | 150 | 50 | 65 | 3.5 | 35 | 61 | 5.7 |
| 7 | 150 | 56 | 56 | 2.5 | 35 | 59 | 4.8 |
| 8 | 150 | 50 | 67 | 3.0 | 35 | 80 | 5.6 |
| 9 | 90 | 50 | 78 | 3.8 | 35 | 70 | 3.1 |
| 10 | 90 | 50 | 78 | 3.8 | 18 | 74 | 3.9 |
| 11 | 90 | 50 | 78 | 3.5 | 55 | 61 | 3.3 |
| 12 | 230 | 50 | 78 | 3.5 | 55 | 82 | 9.4 |
| 13 | 230 | 50 | 78 | 3.8 | 18 | 83 | 9.4 |
| 14 | 230 | 50 | 78 | 3.5 | 35 | 81 | 11.6 |
| 15 | 230 | 60 | 78 | 3.0 | 35 | 80 | 11.2 |
| 16 | 230 | 71 | 78 | 2.5 | 35 | 74 | 10.9 |
| 17 | 230 | 71 | 78 | 2.5 | 55 | 77 | 8.3 |
| 18 | 230 | 89 | 77 | 2.0 | 55 | 43 | 9.5 |

| Barrel Temperatures: | |
|---|---|
| 1 | 400 F. |
| 2 | 400 |
| 3 | 400 |
| 4 | 415 |
| 5 | 450 |
| 6 | 480 |
| Head Zone | 430 |
| Adapters | 410 |
| Melt Temp | 451 |
| Head Pressures | 1200 |
| Die Pressure | 1050 |
| Extruder Speed | 76 RPM |

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A method for forming a decorative laminate, comprising the steps of:
   stacking a decorative laminate sheet assembly having a top layer, the top layer being composed of a melamine resin impregnated alpha cellulose paper sheet;
   preparing a polypropylene sheet including a first surface and a second surface, wherein the step of preparing a polypropylene release includes casting a polypropylene release sheet wherein the polypropylene release sheer is cast embossed will chill rollers having a temperature of between approximately 150° F. and 239° F. and the chill rollers are treated with a co-deposition coating of a polytetrafluoroethylene and electroless nickel in a manner which improves the gloss characteristics of the resulting decorative laminate and wherein the polypropylene has a melt flow of approximately 12 g/10 min, a density of approximately 0.91 g/cc, a tensile strength of approximately 5,800 psi elongation of approximately 10 percent at yield, a tensile modulus of approximately 280,000 psi a flexural modulus of approximately 270,000 psi, a melting point of approximately 333° F., and a recrystallization point of approximately 261° F.;
   positioning the polypropylene sheet on the top layer of the decorative laminate sheet assembly;
   applying heat and pressure to the decorative laminate sheet assembly and the polypropylene sheet sufficient to bond the decorative laminate and releasably bond the polypropylene sheet to the top layer of the decorative laminate sheet assembly; and
   removing the polypropylene sheet from the top layer of the decorative laminate sheet assembly to reveal a decorative laminate.

2. The method according to claim 1, wherein the chill rollers are further treated with an underlayer of nickel.

3. The method according to claim 1, wherein the step of preparing the polypropylene sheet includes applying a textured surface to the first surface during formation of the polypropylene sheet, wherein the textured surface is formed on the polypropylene sheet at a temperature above a melting temperature of a component of the polypropylene sheet, wherein the component is polypropylene; the second surface is smooth and is opposite the first textured surface, wherein the polypropylene sheet imparts the desired texture substantially to a decorative laminate sheet assembly when placed against the decorative laminate sheet assembly and subjected to heat and pressure.

4. A method for forming a decorative laminate, comprising the steps of:

stacking a decorative laminate sheet assembly having a top layer, the top layer being composed of a melamine resin impregnated alpha cellulose paper sheet;

preparing a polypropylene sheet including a first surface and a second surface, wherein the step of preparing a polypropylene release includes casting a polypropylene release sheet wherein the polypropylene release sheet is cast embossed with chill rollers having a temperature of between approximately 150° F. and 239° F. and the chill rollers are treated with electropolishing in a manner which improves the gloss characteristics of the resulting decorative laminate and wherein the polypropylene has a melt flow of approximately 12 g/ 10 min, a density of approximately 0.91 g/cc, a tensile strength of approximately 5,800 psi, elongation of approximately 10 percent at yield, a tensile modulus of approximately 280,000 psi, a flexural modulus of approximately 270,000 psi, a melting point of approximately 333° F., and a recrystallization point of approximately 261° F.;

positioning the polypropylene sheet on the top layer of the decorative laminate sheet assembly;

applying heat and pressure to the decorative laminate sheet assembly and the polypropylene sheet sufficient to bond the decorative laminate and releasably bond the polypropylene sheet to the top layer of the decorative laminate sheet assembly; and removing the polypropylene sheet from the top layer of the decorative laminate sheet assembly to reveal a decorative laminate.

5. The method according to claim 4, wherein the step of preparing the polypropylene sheet includes applying a textured surface to the first surface during formation of the polypropylene sheet, wherein the textured surface is formed on the polypropylene sheet at a temperature above a melting temperature of a component of the polypropylene sheet, wherein the component is polypropylene; second surface is smooth and is opposite the first textured surface, wherein the polypropylene sheet imparts the desired texture substantially to a decorative laminate sheet assembly when placed against the decorative laminate sheet assembly and subjected to heat and pressure.

* * * * *